United States Patent Office 3,131,992
Patented May 5, 1964

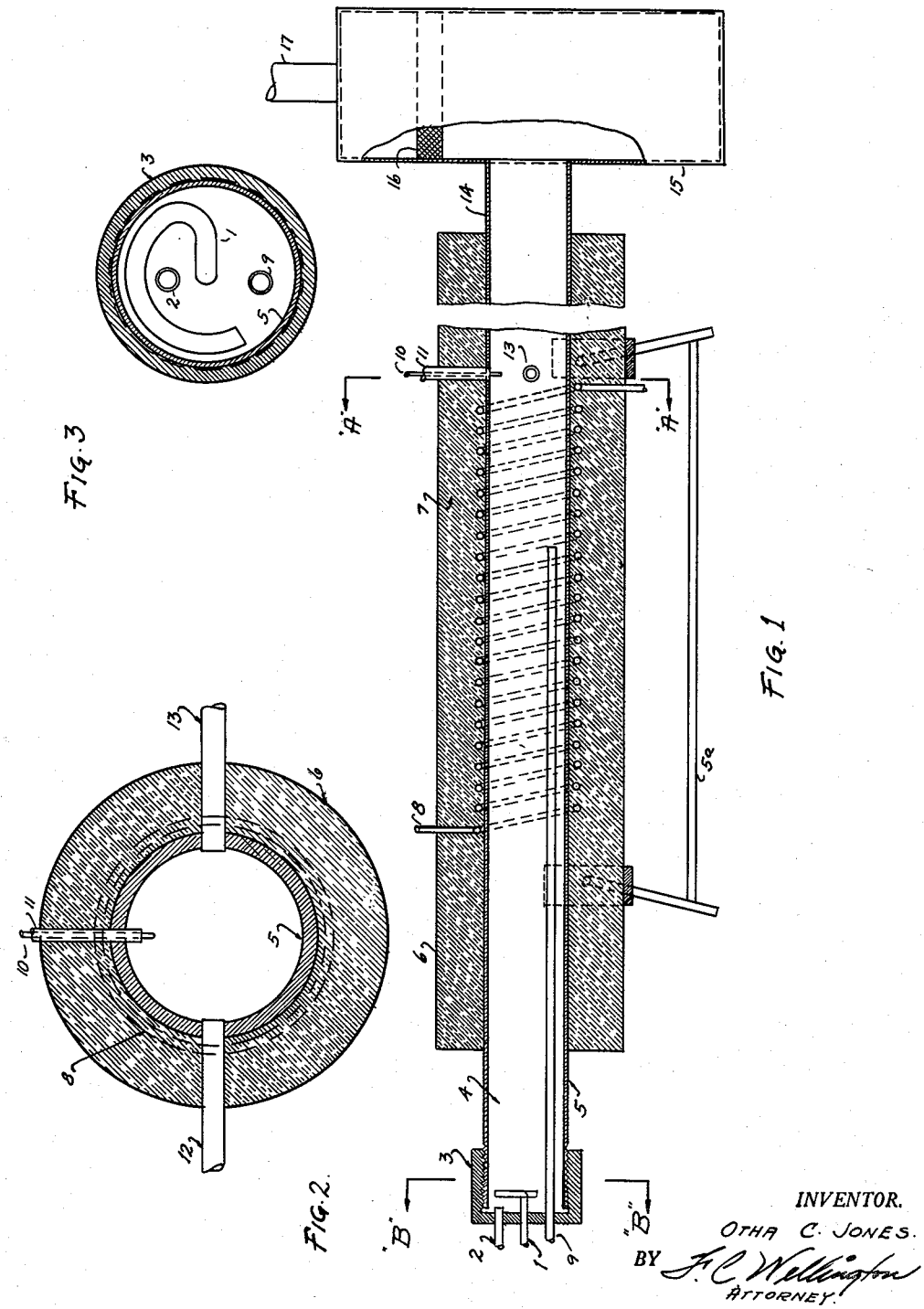

3,131,992
METHOD FOR PRODUCING AMMONIA-PHOSPHORUS PENTOXIDE REACTION PRODUCTS
Otha C. Jones, Dickinson, Tex., assignor to Monsanto Chemical Company, St. Louis, Mo., a corporation of Delaware
Filed Apr. 30, 1956, Ser. No. 581,665
14 Claims. (Cl. 23—14)

This invention relates to a novel and economically feasible method of making ammonia-phosphorus pentoxide complexes by the reaction of substantially anhydrous ammonia and phosphorus pentoxide.

An object of the present invention is to provide a continuous method of making ammonia-phosphorus pentoxide complexes from substantially anhydrous ammonia and phosphorus pentoxide vapor or gaseous products containing same.

An additional object is to provide a method of producing ammonia-phosphohrus pentoxide complexes in which the reaction conditions and quality of the product may be readily controlled.

Another object is to provide a method of producing the above products in which the reaction conditions and products are readily reproducible and predictable and therefore translation from a plant of a given productive capacity to one of a substantially different capacity can be readily made without extensive experimentation.

A further object is to provide a method of producing the above products, which is adapted for large volume production and requires only relatively simple and inexpensive equipment as compared with that of the prior art.

A still further object is to provide ammonia-phosphorus pentoxide complexes which are eminently suitable for use as fertilizers and as water softening and flameproofing compounds.

Other objects and advantages will be apparent to those skilled in the art as the description of the invention proceeds.

Heretofore, ammonia-phosphorus pentoxide complexes have been prepared by several different methods which are subject to a number of disadvantages, and, therefore, are commercially unattractive.

For example, the above products have been prepared by reacting gaseous ammonia with solid phosphorus pentoxide, but this method of approach is impractical since an impervious coating is formed on the surface of the pentoxide which prevents further reaction with ammonia.

Another method of producing the above products involves the reaction of liquid ammonia with phosphorus pentoxide, but this technique is objectionable since it involves the use of low temperatures which require refrigerating equipment or solid carbon dioxide-solvent mixtures. Moreover, it is subject to the further disadvantage of requiring large and expensive equipment for large volume production.

An additional method of manufacturing the above products involves the reaction of gaseous or liquid ammonia with a suspension of phosphorus pentoxide in an organic solvent for the reaction product. However, this method of approach is unsatisfactory since the resulting products are contaminated with from 10% to 20% by weight of the solvent which apparently is present in the ammonia-phosphorus pentoxide complex in the form of a nitrogenous organic reaction product. This nitrogenous organic product can be removed with considerable difficulty but only after partial decomposition of the desired product with liberation of ammonia. Finally, this method is subject to the further drawback of requiring agitators and being unsuitable for operation on a large scale without resorting to the use of numerous large and expensive pieces of equipment.

I have developed a novel and commercially feasible method of continuously producing ammonia-phosphorus pentoxide complexes, which has none of the disadvantages and objectionable features mentioned above.

In accordance with this method, elemental phosphorus is ignited in dry air to form a combustion product containing phosphorus pentoxide, which is reacted with anhydrous ammonia gas in the gaseous phase and at a temperature between about 240° C. and about 725° C., and preferably between 450° F. and 950° F., i.e., substantially in the range of from about 240° C. to about 500° C. The gaseous reaction product thus obtained it then cooled to yield an ammonia-phosphorus pentoxide complex which is collected as a free-flowing powder.

In the practice of this method, the ammonia and phosphorus pentoxide are supplied to the reaction zone at rates providing these reactants in a $NH_3/P_2O_5$ molar ratio above 2.1/1, and preferably within the range of about 2.2/1 to about 3.25/1. Stated in a different manner, the above reactants are supplied to the reaction zone in the proportions required to yield a product having a molar ratio of $NH_3$ to $P_2O_5$ of from about 2.1/1 to about 2.7/1. The reaction is carried out in the gaseous phase in the absence of added water other than the negligible amount present in the anhydrous gaseous ammonia and in the dry air employed in burning the phosphorus to phosphorus pentoxide. A small amount of water may be formed by intermediate or side reactions of the ammonia, air, and/or phosphorus pentoxide, but the total amount of water which is present during the reaction of phosphorus to phosphorus pentoxide and during the gaseous phase reaction of ammonia with the phosphorus pentoxide should be considerably less than 0.01 part of water per part of phosphorus, or less than 0.5 part of water per 100 parts of phosphorus pentoxide.

For a more complete understanding of the present invention, reference is made to the accompanying drawings in which:

FIGURE 1 is a verticle sectional view of apparatus suitable for carrying out the vapor phase reaction between substantially anhydrous ammonia and phosphorus pentoxide in accordance with the instant invention.

FIGURE 2 is an enlarged cross sectional view taken on line A—A of FIGURE 1.

FIGURE 3 is an enlarged cross sectional view taken on line B—B of FIGURE 1.

Referring more specifically to the above drawings, reference characters 1 and 2 represent inlet lines supported by pipe cap 3 for introducing dry air and molten phosphorus into the combustion chamber 4 of the stainless steel tube 5. As shown in FIGURE 3, the end of the air inlet tube 1 is curved at a right angle to its longitudinal axis so that the air will be injected into the combustion chamber tangentially. This sets up a swirling motion, and consequently better mixing of the air with phosphorus vapor and more efficient combustion are obtained.

The stainless steel tube 5 has a diameter and length of 2 and 50 inches respectively, and is provided throughout the greater part of its length with suitable insulation 6. The intermediate section 7 of this insulation is equipped with electrical windings 8 for the purpose of further heating (i.e., maintaining the temperature of) the phosphorus combustion products passing through tube 5. The insulated stainless steel tube 5 is supported by a cradle 5a or any other suitable means.

The stainless steel tube 5 is further provided with a themocouple well 9 carrying a thermocouple (not shown) for measuring the temperature of the combustion products at the point indicated, and an additional thermocouple 10 for indicating the temperature of the above products at the point of the ammonia introduction.

The thermocouple well 9 is supported by pipe cap 3 and the thermocouple 10 is introduced into the stainless steel tube by means of line 11.

Reference characters 12 and 13 represent lines for introducing ammonia gas into the stainless steel tube 5 for reaction with the hot phosphorus combustion products.

The stainless steel tube 5 is connected by means of a section 14 with a collection chamber 15 for recovering the ammonia-phosphorus pentoxide reaction products. This chamber is provided with a filter 16 which permits air and unreacted ammonia to pass out of the system by line 17, and prevents the finely divided solid reaction product from being entrained by the above gaseous product.

In the practice of the instant invention in the above apparatus, molten phosphorus and an excess of dry air are introduced at a controlled rate into the combustion chamber where the phosphorus is ignited to produce a gaseous product including phosphorus pentoxide vapor. This product flows through the stainless steel pipe and during its travel therethrough is brought to a temperature within the range of about 240° C. to about 725° C., and preferably between about 240° C. and about 500° C., and then is immediately reacted with substantially anhydrous ammonia gas which is introduced by way of lines 12 and 13. The resulting reaction product is passed through the air-cooled zone 14 to separate an ammonia-phosphorus pentoxide complex which collects in chamber 15 as a free flowing white powder. The gaseous residue, which includes excess air and unreacted ammonia, is conducted through the filter 16 and then discharged from the system by way of line 17.

The means and procedures used to bring the phosphorus combustion products temperature down to the 240° C. to 725° C. range (or 240° C. to 500° C. range) will vary somewhat depending upon the distance between the combustion chamber and the point of introduction of ammonia, the velocity of the combustion products, the dimensions (and especially the surface to volume ratio) of the equipment, and other factors. The flame temperature of the phosphorus oxidation reaction will be somewhere in the neighborhood of 1200° C. to 1600° C. If these hot combustion gases are transported rapidly through a short conduit having a relatively low surface to volume ratio, it is quite possible that the gases will not have cooled to a satisfactorily low temperature. In such a case, additional measures must be taken to cool said combustion gases—such as by diluting them with cool air, cooling the combustion chamber and/or conduit walls, etc. On the other hand, if the point of ammonia introduction is relatively far removed from the combustion zone, and the combustion gases travel rather slowly from one to the other through a conduit having a high surface to volume ratio, then the gases temperature may be too low by the time the gases reach the ammonia reaction zone. In such a case it may be necessary to heat the combustion chamber or conduit walls in order to maintain the gases at the proper temperature.

The practice of the instant invention is further illustrated by the following examples:

*Example I*

Elemental molten phosphorus was oxidized in an excess of dry air for a period of three hours in the above described apparatus, producing a gaseous product including phosphorus pentoxide vapor. This product was continuously reacted with anhydrous gaseous ammonia which was charged at a rate providing an ammonia to phosphorus pentoxide molar ratio of about 2.70/1, the reaction taking place at a temperature of from 340° C. to 350° C.

The dry air used in the phosphorus combustion operation was introduced in an amount corresponding to 100% in excess of that required to convert the phosphorus to phosphorus pentoxide. The gaseous ammonia was supplied in an amount corresponding to 7.6% in excess of that required to yield an ammonia-phosphorus pentoxide reaction product having these materials combined in an $NH_3:P_2O_5$ molar ratio of about 2.5/1.

The product of the ammonia-phosphorus pentoxide reaction was quickly cooled to about 150° C. within a period of less than 3 seconds and then condensed in the collector as a free flowing white powder in an amount corresponding to 95% of theory, based on $P_2O_5$ in feed. The gaseous residue including air and unreacted ammonia and less than 0.5 part of water vapor per 100 parts of $P_2O_5$ was passed through the filter 16 and discharged from the system.

The product which condensed in the collector had the following properties:

Percent $NH_3$ ---------------------------------- 21.93
Percent $P_2O_5$ --------------------------------- 73.28
$NH_3/P_2O_5$ ----------------------------------- 2.5/1
pH in 1% sol ---------------------------------- 6.85
Hygroscopicity at 75% relative humidity at 30° C. (percent by weight) ----------------- 37.8
Solubility at 30° C. (grams/100 grams of water) -- 19.0

*Example II*

The gaseous phase procedure described in Example 1 was repeated using the following operating conditions:

Time of run ---------------------- 2 hours.
Reaction temperature range -------- 535° C.–675° C.
Average reaction temperature ------ 610° C.
Percent excess ammonia gas -------- 18.7.
Percent excess air ---------------- 77.0.
$NH_3/P_2O_5$ molar ratio ----------- 3.08/1.
Reaction product cooling rate ------ Cooled to about 150° C. in less than 3 seconds.

A free flowing white product was obtained in a yield corresponding to 66.7% of theory, based on $P_2O_5$ in feed. This product possessed the following properties:

Percent $NH_3$ ---------------------------------- 22.44
Percent $P_2O_5$ --------------------------------- 75.57
$NH_3/P_2O_5$ molar ratio ----------------------- 2.48/1
pH in 1% solution ------------------------------ 7.4
Hygroscopicity at 75% R.H. at 30° C. (percent by weight) ------------------------------- 41.2
Solubility at 30° C. (grams/100 grams of $H_2O$)-- 10–15

*Example III*

The gaseous phase procedure described in Example 1 was followed except that the following operating conditions were employed:

Time of run ---------------------- 1 hour.
Reaction temperature range -------- 590° C.–725° C.
Average reaction temperature ------ 690° C.
Percent excess ammonia gas -------- 3.
Percent excess air ---------------- 100.
$NH_3/P_2O_5$ molar ratio ----------- 2.66/1.
Reaction product cooling rate ------ Cooled to about 150° C. in less than 3 seconds.

As a result of the above run, a free-flowing white product having the following properties was obtained in a yield corresponding to 78.2% of theory:

Percent $NH_3$ ---------------------------------- 20.82
Percent $P_2O_5$ --------------------------------- 76.85
$NH_3/P_2O_5$ molar ratio ----------------------- 2.27/1
pH in 1% solution ------------------------------ 5.3
Hygroscopicity at 75% R.H. at 30° C. (percent by weight) ------------------------------- 28.7
Solubility at 30° C. (grams/100 grams of $H_2O$)-- 10–15

*Examples IV through XVIII*

The procedures described in the preceding examples were duplicated with variations in specific reaction conditions. These reaction conditions and the results thereof are set forth in the following table:

| Example No. | Reaction Conditions ||||||| Product Analyses |||| Product Yield, Percent |
|---|---|---|---|---|---|---|---|---|---|---|
| | Run Duration, Hours | Reaction Temperature Range, °C. | Average Reaction Temperature, °C. | Percent Excess $NH_3$ | Percent Excess Air | Mol Ratio, $NH_3/P_2O_5$ | Wt. percent as $NH_3$ | Wt. percent as $P_2O_5$ | Mol Ratio, $NH_3/P_2O_5$ | |
| IV | 2.6 | 390–420 | 405 | 22 | 91.5 | 2.96 | 22.45 | 74.86 | 2.64 | 85 |
| V | 1.25 | 350–400 | 370 | 2.0 | 70 | 2.54 | 21.01 | 75.66 | 2.33 | 92.5 |
| VI | 4.0 | 370–420 | 395 | 3.5 | 100 | 3.76 | 21.08 | 75.86 | 2.33 | 90.5 |
| VII | 3.0 | 365–390 | 375 | 7.0 | 100 | 3.88 | 21.92 | 75.35 | 2.43 | 93.5 |
| VIII | 2.4 | 475–515 | 500 | 2.5 | 100 | 3.72 | 21.66 | 75.34 | 2.41 | 90.0 |
| IX | 5.0 | 275–330 | 305 | 33 | 94 | 3.58 | 22.51 | 77.64 | 2.42 | 91.5 |
| X | 2.0 | 430–480 | 455 | 96 | 220 | 4.68 | 21.80 | 75.22 | 2.42 | 65.3 |
| XI | 2.0 | 340–415 | 385 | 100 | 230 | 5.34 | 22.84 | 73.83 | 2.58 | 73.9 |
| XII | 2.0 | 425–460 | 450 | 105 | 270 | 5.50 | 23.11 | 74.75 | 2.58 | 74.0 |
| XIII | 3.5 | 385–490 | 440 | 120 | 220 | 5.52 | 23.15 | 74.09 | 2.61 | 89.9 |
| XIV | 2.0 | 420–450 | 435 | 29 | 115 | 3.24 | 22.23 | 74.91 | 2.48 | 88.0 |
| XV | 3.3 | 355–435 | 395 | 46 | 125 | 3.86 | 22.13 | 75.12 | 2.46 | 91.7 |
| XVI | 3.0 | 375–420 | 405 | 20 | 74 | 3.0 | 22.81 | 76.41 | 2.49 | 75.0 |
| XVII | 1.5 | 205–255 | 240 | 8.2 | 100 | 3.92 | 22.42 | 74.61 | 2.51 | 90.0 |
| XVIII | 4.3 | 340–350 | 345 | 8.0 | 100 | 3.92 | 21.62 | 73.94 | 2.44 | 92.0 |

The products obtained in accordance with the preceding examples are particularly useful as fertilizers, flameproofing materials, water softening agents, builders for detergent compositions, and the like. As further evidence of such utility, there is set forth below some of the pertinent properties (alkalinity, solubility, and calcium sequestering ability) of a few of the products prepared as described in the examples (namely, Examples 5, 15, 16 and 17).

| Product (Example No.) | pH of 1% Solution | Solubility gr./100 ml. $H_2O$ | CRT [1] Value, grams |
|---|---|---|---|
| V | 5.1 | 12 | 6.6 |
| XV | 7.5 | 15 | 6.3 |
| XVI | 5.5 | 30 | 7.2 |
| XVII | 6.4 | 30 | 6.0 |

[1] Calcium Repression Test.

The reaction conditions used in the above examples may be varied widely without departing from the principles of the invention.

For example, the gaseous phase reaction described herein between substantially anhydrous ammonia and phosphorus pentoxide are preferably carried out at temperatures substantially in the range of about 240° C. to about 500° C. However, as is shown in the examples, the reaction can also be carried out at temperatures as high as 725° C. or higher.

In a preferred embodiment of this invention, the reaction products are subjected to quick cooling in order to obtain them in a dry free-flowing condition. Quick cooling within the meaning of the present specification means that the reaction product must be cooled to a temperature below 200° C., preferably below 175° C., within a specified sojourn time. The sojourn time of the reactants and reaction product from the point of ammonia introduction to the point where the excess air and ammonia pass through the filter is generally less than about 10 seconds, and preferably from about 3 to about 5 seconds or less. This cooling is accomplished by means of air, externally applied water, or any other suitable heat exchanging media, it being understood that the reactor, the collector and the connecting tube are composed of material which is suitable, when employed in connection with the selected media, for effecting the required cooling rate. This cooling is, of course, supplemented by the excess air and ammonia used in carrying out the phosphorus combustion and ammonia-$P_2O_5$ reactions, respectively.

In executing the gaseous phase reaction, the dry air is employed in an amount sufficient to oxidize the phosphorus to phosphorus pentoxide, but it is preferred to use an amount substantially in excess of that required to convert all of the phosphorus to phosphorus pentoxide.

In general, from about 20% to about 300% excess of air is used and within this range about 75% to about 100% excess air is preferred. The air serves the purpose of oxidizing the phosphorus to $P_2O_5$, of aiding in the quick cooling of the gaseous reaction product and of acting as a carrier for the $P_2O_5$ vapor.

The term "dry air" is not used herein in the restricted sense of air from which all water has been completely removed. Instead, the term is used in the normal sense understood by persons familiar with gas drying technology as air which has been artificially dried to reduce its dew point (moisture content) to the reasonably low but readily attainable level of about −40° F. (0.00008 pound of water per pound of dry air) or lower. Because of its general usage, such air is commonly known as "commercially dry" air. (See, for example, Perry, "Chemical Engineers Handbook," McGraw-Hill Book Co., New York (1959), 3rd edition, page 877.)

The gaseous ammonia many be employed in an amount substantially in the range of about 100% to about 120% or higher of the theoretical amount required to yield a product having a given $NH_3/P_2O_5$ molar ratio and within these limits about 5% to 15% excess is preferred. In addition to being a reactant, the excess gaseous ammonia facilitates quick cooling by removing heat from the system.

As stated earlier, a preferred embodiment of the invention involves the reaction carried out at a temperature of about 240° C. to about 500° C. Another preferred embodiment involves reaction about 550° F. and about 700° F. A further preferred temperature is one from about 325° C. to about 350° C., since in this range the resulting product is obtained in yields as high as about 95% of theory.

The products of the gaseous phase reaction are extremely valuable as water softeners since they have the property of holding calcium and magnesium ions of hard waters in solution or colloidal suspension in the presence of fatty acid soap solutions. However, their capacity for performing the above function decreases as their temperature of formation increases since an increase in their temperature of formation tends to give results in a decrease in their water solubility. The foregoing products are also useful as fertilizers and as flameproofing agents for cellulose materials and textile fabrics such as cotton duck, cotton muslin, viscose rayon, silk, linen or wool.

The following table gives the analysis of a typical product produced in studies of my process:

| | |
|---|---|
| P, wt. percent | 31.3 |
| Total N, wt. percent | 17.1 |
| Ammoniacal N, wt. percent | 12.1 |
| Atomic ratio, N:P | 1.21 |
| Ratio, ammoniacal N:total N | 0.71 |

The products are very probably mixtures of several different components, but the chemical structures of the components are not at all certain. It has been suggested (Driskell et al., U.S. 2,713,536) that the products are mixtures consisting essentially of ammonium metaphosphate, ammonium phosphoronitridate and phosphoronitridic acid, but this suggestion is probably in error. It is believed more likely that the products are polyimidophosphates containing some

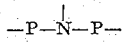

linkages as well as the —P—O—P— linkages. The polymers are probably occasionally cross-linked through some of the nitrogen atoms to form "net" polymers, or three dimensional arrays which degrade in water by rupture of cross-linkage to form more water-soluble straight chain molecules averaging from about 7 to about 12 phosphorus atoms per chain and having molecular weights in the range of 600 to 1000.

This application is a continuation-in-part of my application Serial No. 465,021, filed October 27, 1954, and now abandoned, which was in turn a continuation-in-part of application Serial No. 253,112, filed October 25, 1951, in the name of Otha C. Jones et al., and now U.S. Patent No. 2,717,198.

It is to be understood that the invention is not confined to the specific embodiments described above, but includes all such variations, modifications, and equivalents as fall within the scope of the appended claims.

I claim:

1. The process which comprises the steps of drying air to a moisture content of less than 0.00008 pound water per pound dry air; oxidizing elemental phosphorus with the dry air; cooling the products of combustion to a temperature of 450° to 950° F.; reacting the phosphorus pentoxide vapor in the cooled combustion products with anhydrous ammonia; and collecting the solid, finely divided product of said reaction.

2. The process of claim 1 in which the proportion of ammonia reacted with phosphorus pentoxide is within the range of 2.1 to 2.7 moles $NH_3$ per mole of $P_2O_5$.

3. The process of claim 1 wherein the products of combustion are cooled to a temperature in the range from 550° to 700° F. prior to reaction with anhydrous ammonia.

4. The process of claim 1 wherein the products of reaction are cooled to a temperature in the range from 550° to 700° F. and the phosphorus pentoxide therein is reacted with from 2.1 to 2.7 moles of ammonia per mole of phosphorus pentoxide.

5. The process which comprises the steps of drying air to a moisture content of less than 0.00008 pound water per pound dry air; oxidizing elemental phosphorus with the dry air; cooling the products of combustion to a temperature of 240° C. to 725° C.; reacting the phosphorus pentoxide vapor in the cooled combustion products with anhydrous ammonia; and collecting the solid, finely divided product of said reaction.

6. The process which comprises the steps of drying air to a moisture content of less than about 0.0004 pound water per pound dry air; oxidizing elemental phosphorus with the dry air; cooling the products of combustion to a temperature of 450° to 950° F.; reacting the phosphorus pentoxide vapor in the cooled combustion product with anhydrous ammonia; and collecting the solid, finely divided product of said reaction.

7. The process of claim 6 in which the proportion of ammonia reacted with phosphorus pentoxide is within the range of 2.1 to 2.7 moles $NH_3$ per mole of $P_2O_5$.

8. The process of claim 6 wherein the products of combustion are cooled to a temperature in the range from 550° to 700° F. prior to reaction with anhydrous ammonia.

9. The process of claim 6 wherein the products of reaction are cooled to a temperature in the range from 550° to 700° F. and the phosphorus pentoxide therein is reacted with from 2.1 to 2.7 moles of ammonia per mole of phosphorus pentoxide.

10. The process which comprises the steps of drying air to a moisture content such that the hereinafter specified maximum concentration of water present during reaction of phosphorus pentoxide and ammonia is not exceeded; oxidizing elemental phosphorus with the dry air; cooling the products of combustion to a temperature of 450° to 950° F.; reacting the phosphorus pentoxide vapor in the cooled combustion products with anhydrous ammonia in the presence of less than 0.01 part of water per part of phosphorus; and collecting the solid, finely divided product of said reaction.

11. The process of claim 10 in which the proportion of ammonia reacted with phosphorus pentoxide is within the range of 2.1 to 2.7 moles $NH_3$ per mole of $P_2O_5$.

12. The process of claim 10 wherein the products of combustion are cooled to a temperature in the range from 550° to 700° F. prior to reaction with anhydrous ammonia.

13. The process of claim 10 wherein the products of reaction are cooled to a temperature in the range from 550° to 700° F. and the phosphorus pentoxide therein is reacted with from 2.1 to 2.7 moles of ammonia per mole of phosphorus pentoxide.

14. The method of producing valuable products, which comprises supplying air and elemental phosphorus to a combustion chamber where the phosphorus is oxidized to form gaseous phosphorus pentoxide, introducing gaseous ammonia into said gaseous phosphorus pentoxide to effect a reaction between said materials in the gaseous phase and then cooling the resulting reaction product in a period up to 5 seconds to a temperature below 175° C., said gaseous phase containing less than 0.5 part of water per 100 parts of phosphorus pentoxide, said reactants being employed in the proportions yielding a product having an ammonia to phosphorus pentoxide molar ratio substantially in the range of about 2.1/1 to about 2.7/1, said reaction being carried out at a temperature in the range of about 240° C. to about 725° C. and said air being employed in an amount equivalent to about 20% to about 300% in excess of that required to oxidize said phosphorus to phosphorus pentoxide.

References Cited in the file of this patent

UNITED STATES PATENTS

| | | |
|---|---|---|
| 2,561,415 | Rice | July 24, 1951 |
| 2,596,935 | Malowan et al. | May 13, 1952 |
| 2,689,780 | Rice | Sept. 21, 1954 |